United States Patent [19]

Fleming

[11] Patent Number: 5,279,633
[45] Date of Patent: Jan. 18, 1994

[54] METHOD OF PRODUCING A GLASS BODY

[76] Inventor: James W. Fleming, 245 Tuttle Pkwy., Westfield, N.J. 07090

[21] Appl. No.: 464,576

[22] Filed: Jan. 16, 1990

Related U.S. Application Data

[63] Continuation of Ser. No. 247,228, Sep. 21, 1988, abandoned.

[51] Int. Cl.$^5$ .................. C03B 37/16; C01B 33/18
[52] U.S. Cl. .......................... 65/2; 65/3.11; 65/18.1; 65/18.2; 65/21.5
[58] Field of Search .................. 65/2, 3.11, 3.12, 17, 65/18.1, 18.2, 32, 900, 901, 21.5; 501/12; 423/338

[56] References Cited

U.S. PATENT DOCUMENTS

| | | |
|---|---|---|
| 3,954,431 | 5/1976 | Fleming et al. |
| 4,419,115 | 12/1983 | Johnson et al. |
| 4,680,045 | 7/1987 | Osafune et al. ............ 65/18.1 |
| 4,767,429 | 8/1988 | Fleming et al. ............ 65/18.1 |
| 4,775,401 | 10/1988 | Fleming et al. ............ 65/18.1 |
| 4,812,153 | 3/1989 | Andrejco et al. ............ 65/30.13 |
| 4,872,895 | 10/1989 | Fleming et al. ............ 65/18.1 |

FOREIGN PATENT DOCUMENTS

| | | | |
|---|---|---|---|
| 0271281 | 6/1988 | European Pat. Off. ............ 65/18.1 |
| 62-70236 | 3/1987 | Japan ............ 65/18.1 |
| 2038311 | 7/1980 | United Kingdom ............ 65/3.11 |
| 2083806 | 3/1982 | United Kingdom ............ 65/3.12 |

OTHER PUBLICATIONS

"Better Ceramics Through Chemistry", *Materials Research Society Symposia Proc.*, vol. 32, Uhlmann et al., Feb. 1984, pp. 59-70.
*Treatise on Materials Science and Technology*, vol. 22, Academic Press, Sumio Sakka, 1982, pp. 129-167.
"Soluble Silicates", *ACS Symposium Series*, American Chemical Society, Klein et al., Aug. 26-27, pp. 294-304.
"A Novel High-Rate Fabrication Process for Optical Fiber Preforms":, *Fourth International Conference on Integrated Optics and Optical Fiber Communication*, Technical Digest, Sudo et al., Jun. 27-30, 1983.

*Primary Examiner*—Peter Kratz

[57] ABSTRACT

A convenient method of producing porous silica particles is disclosed. The particles produced by the method can have impurity levels in the parts-per-billion range, and can have substantially uniform size. The particles are advantageously used to produce silica-containing glass bodies such as optical fiber preforms, silica tubes, lenses, rods and the like. The method comprises forming a silica-containing sol in comminution device or forming such a sol and introducing it into a comminution device, causing a gel to form from the sol, and comminuting the gel in the comminution device such that substantially dry, porous particles result.

12 Claims, 3 Drawing Sheets

METHOD OF PRODUCING A GLASS BODY

This application is a continuation of application Ser. No. 247,228, filed on 9/12/88, abandoned.

FIELD OF THE INVENTION

This invention pertains to methods of forming silica-containing glass bodies using precursor material produced by a sol/gel process.

BACKGROUND OF THE INVENTION

Much effort has recently been expended on producing glass by sol/gel processes. For a recent partial review of the field, see, for instance, D. R. Uhlmann et al, in *Better Ceramics Through Chemistry*, Materials Research Society Symposia Proceedings, Vol. 32, C. J. Brinker et al, editor, (1984), pp. 59–70.

Sol/gel methods for producing glass precursor material can be divided into techniques that form a gel using pre-existing colloidal particles (e.g., fumed silica), and into techniques that form a gel by hydrolysis and polymerization of appropriate chemical compounds. This application is primarily concerned with glass produced by techniques in the latter category, and by a combination of the two techniques. The techniques of primary concern herein will be collectively referred to as "polymerization" techniques.

Polumerization techniques may result in gel formation even though a classical sol may not have been formed in the process. It is customary, however, to refer to these processes as sol/gel processes. Typically, gels formed by polymerization techniques are among the monolithic gels. Such a gel may be pictured as a continuous three dimensional molecular network, or a network of bonded 2–5 nm diameter particles, having a sponge-like structure, with liquid occluded in the interstices of the "sponge".

Prominent among the known polymerization techniques is the alkoxide method which is reviewed, for instance, by S. Sakka, *Treatise on Material Science and Technology*, Vol. 22, Academic Press (1982), pp. 129–167. See also L. C. Klein et al., *Soluble Silicates*, ACS Symposium Series, Vol. 194, American Chemical Society (1982), pp. 293–304.

Recently a very convenient and effective sol/gel method of forming silica-based glass has been disclosed. See U.S. Pat. No. 4,767,429, issued Aug. 30, 1988 for J. W. Fleming and S. A. Pardenek, incorporated herein by reference. The method, termed the "Vapogel" technique, involves the introduction of a silicon halide-containing gas (e.g., $SiCl_4$) into an aqueous medium such that gelation occurs. The resulting gel body typically is dried, and the thus produced porous silica-containing body typically either is sintered such that a glass body results, or is fragmented and the resulting particles used as feed stock in the manufacture of a glass body.

Various techniques are known for producing a glass body from material produced by the sol/gel method. Among these techniques are the double dispersion method of U.S. Pat. No. 4,419,115, and the particle fusion technique of U.S. Pat. No. 3,954,431, incorporated herein by reference, both co-assigned with this. See also S. Sudo et al, *Technical Digest, Fourth International Conference on Integrated Optics and Optical Fiber Communication*, Tokyo (1983), 27A3–4. The technique of the '431 patent comprises forming a glass body by fusing glass particles to a glass substrate by means of a plasma torch.

Among the advantages of sol/gel processes are their typically relatively low processing temperatures, and, frequently, their potential for economical production of high purity glass.

Among the articles that can potentially comprise a sol/gel-derived glass body is optical fiber drawn from a fiber preform. Such fiber typically is silica-based and comprises a core contactingly surrounded by a cladding, with the former having a higher refractive index than the latter to achieve guiding of electromagnetic radiation of an appropriate wavelength, e.g., in the range 0.7–1.6 μm. The refractive index difference is produced, for instance, by incorporating an up-dopant (a dopant which increases the refractive index of $SiO_2$, e.g. $GeO_2$) into the core region and/or incorporating a down-dopant (a dopant which deceases the refractive index of $SiO_2$ e.g., fluorine) into the cladding. Other examples of articles that can potentially comprise a sol/gel derived glass body are lenses and prisms, and high silicas glass tubes such as are used as substrate tubes in the MCVD process.

As discussed above, it is frequently necessary to form particles from the porous sol/gel-derived material. This tends to be a lengthy process that furthermore has the potential for contamination of the material. For instance, when producing relatively large (e.g. 25 liter) batches of Vapogel material, drying of the material, by heating it in a large container providing 2.5 Kw heating while drawing a vacuum on the container, may take as long as 24 hours, and frequently results in density variation in the dried material due to a difference in drying conditions experienced by the outer regions of the material as compared to the inner regions.

In U.S. patent application Ser. No. 940,392, filed Dec. 11, 1986, now U.S. Pat. No. 4,872,895, co-assigned with this and incorporated herein by reference, is disclosed a method of forming discrete, wet gel particles, essentially all of which have a predetermined, substantially uniform size. The particles are formed by mechanically subdividing, prior to or during gelation, a sol that is capable of undergoing gelation to yield a substantially cohesive gel body, or they are formed by mechanically subdividing a wet, cohesive, substantially elastic gel body (e.g., by pushing the gel body through a screen). In both of the above embodiments the particle size is at least in part determined by the size of a mechanical sizing element, e.g., the size of an orifice or of screen openings. In such processing care must be taken in handling to avoid contamination.

In view of the potential importance of sol/gel-derived glass bodies it would be highly desirable to have available a simple method that can quickly and efficiently produce particulate sol/gel-derived material without resulting in potential contamination thereof. In particular, it would be desirable to have available such a method that can produce particulate material having a relatively narrow size distribution, since particle fusion techniques are typically advantageously practiced with substantially uniformly sized particles. This application discloses such a method.

SUMMARY OF THE INVENTION

Disclosed is a novel method of producing an article that comprises a silica-containing glass body. In many cases the glass body will contain at least about 80% by weight silica ($SiO_2$). Exemplary glass bodies are tubes, rods, lenses, disks, optical fiber preforms, and optical fibers.

The method comprises causing a silica-containing sol to be present in a comminution means (by, e.g., introducing the sol into the means, or by forming the sol in the means), and causing the sol to gel in situ. The method further comprises comminuting the gel in the comminution means such that substantially dry, porous, silica-containing particles result, and using the particles to produce the glass body, e.g., by means of plasma fusion of the particles to a glass substrate. By "substantially dry" porous particles we mean herein particles which contain less than 10% by weight (preferably less than 1%) of liquid.

Typically the comminution means are heated such that gelation occurs within a relatively short time, and such that drying of the particles is facilitated. In currently preferred embodiments the sol is formed by introducing a silicon-halide-containing gas into an aqueous medium, substantially as disclosed in the above referred to U.S. Pat. No. 4,767,429.

After the glass body has been produced, typically in a conventional manner, further processing steps typically are carried out to complete the manufacture of the article. For instance, if the glass body is an optical fiber preform, the further steps may comprise the drawing of optical fiber from the preform, and if the body is an optical fiber then the further steps may comprise application of a polymer coating to the fiber and/or cabling of the fiber.

DETAILED DESCRIPTION OF SOME PREFERRED EMBODIMENTS

Figure 1:
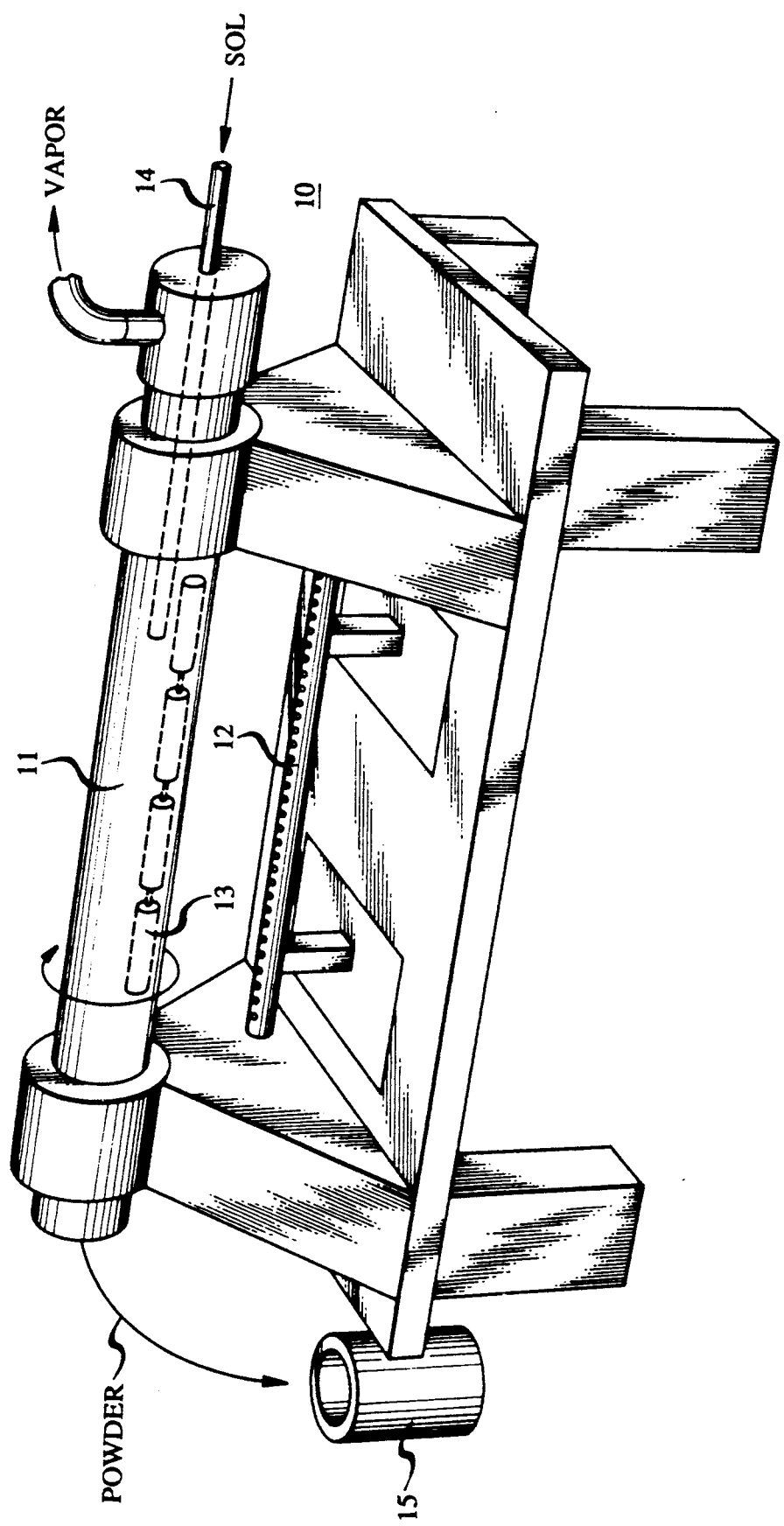
FIGS. 1 and 2 schematically depict exemplary apparatus for the production of porous particles according to the invention, and FIG. 3 schematically shows exemplary apparatus that can be used to fuse the porous particles to a glass substrate, thereby producing a glass body.

A schmatic representation of an exemplary embodiment of apparatus for the practice of the invention is shown in FIG. 1. On glass working lathe 10 is mounted fused silica tube 11 which is rotated in the usual fashion and can be heated by means of oxy-hydrogen burner 12. In tube 11 are fused silica rods 13 or other appropriate means such as silica balls or tubes. Through entrance tube 14 silica-containing sol is introduced into the rotating heated tube 11. The sol rapidly gels in the heated tube, and the heat and mechanical action of the silica rods 13 cause break-up of the gelled material. Evolving vapors (typically $H_2O$ and HCl) are drawn off by appropriate vacuum means (not shown) that typically comprise a scrubber to remove HCl and/or other undesirable constituents from the vapor. The combined action of the burner and the vacuum means result in rapid drying of the gel particles, such that dry porous silica-based particles of substantially uniform size and density result. The lathe is slightly tilted (not shown) such that the rotation of tube 11 causes gradual transport of the particles away from the input end of the tube and towards the output end thereof. Means (not shown) are provided that permit the dried porous particles to be collected in appropriate collection means 15, while preventing significant escape of water and HCl vapor from the output end of the tube. Exemplarily, this is achieved by creating excess gas pressure at the output end of the tube, e.g., by means of a localized heat source or of a gas flow of a few liters/min.

The particles produced according to the invention can be of relatively uniform size, such that later separation according to size will not be necessary in many cases. This of course is a significant advantage in many applications and contributes to the efficiency of the inventive method and purity of the resultant powder. For example, one exemplary set of conditions produces silica particles from a Vapogel-type silica-containing sol, with 98% of the particles being in the range of 100–600 $\mu$m, with average particle size of about 280 $\mu$m. Typically at least 90% by weight of the particles of a sample (e.g., a batch) have sizes within about $\pm 2$ standard deviations from the average size. These particles also are very pure, with contaminant levels in the part per billion range.

In apparatus as described above the comminution means comprised a silica tube of uniform diameter, exemplarily 60–100 mm inner diameter (i.d.) and 190–240 mm length. Within the tube were placed silica cylinders having diameters from 10–30 mm less than the i.d. of the tube and weighing 5–10 kg. The diameters and other process parameters typically are selected so as to achieve the desired particle properties. The cylinders cover approximately 80% of the length of the tube. Exemplarily, the tube was rotated at 30–60 rpm, and was heated over the maximum length possible, with the tube surface maintained at a temperature in the range 600°–1200° C. The resulting rapid drying materially contributed to the comminution of the gel material.

It will be appreciated that the above experimental conditions are exemplary only. For instance, other means for heating the rotating tube could be used. Exemplary of such other heating means is a cylinder furnace that surrounds the tube. Furthermore, for industrial use apparatus according the the invention would typically be scaled up, and optionally be modified to permit continuous production.

For the above described exemplary embodiment sol is introduced into the heated rotating tube. The sol is advantageously in a viscous (typically in the approximate range 10–10,000 poise at room temperature) but not completely gelled state. The sol is prepared in a separate vessel and pumped into the rotating tube. The currently preferred method for producing the sol is the Vapogel method, although other methods (e.g., the alkoxide technique) are not excluded.

Figure 2:
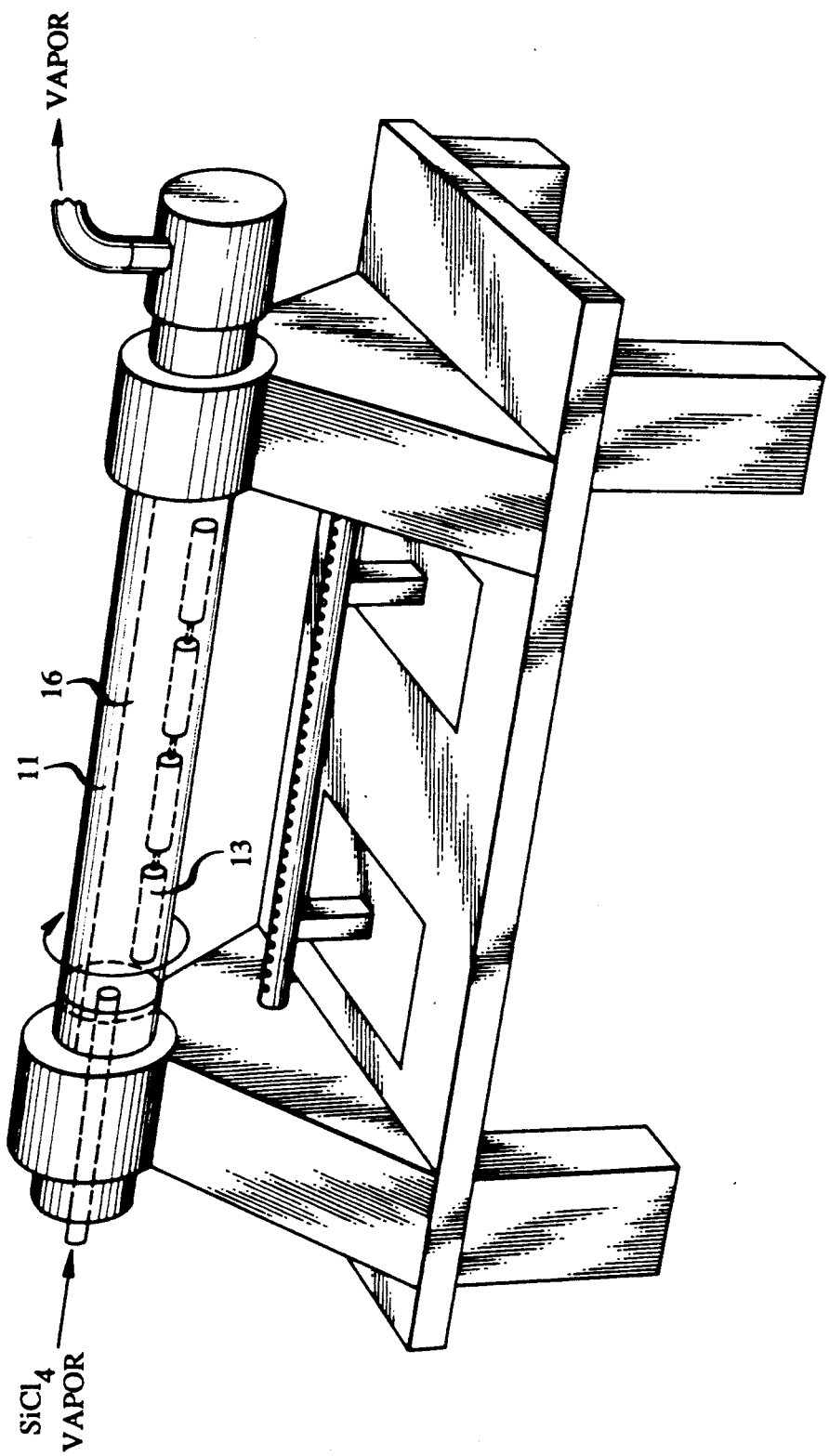

On the other hand, the exemplary embodiment that is depicted in FIG. 2 uses the comminution tube (i.e., the rotating silica tube 11) also as the sol formation vessel, whereby the possibility of contamination can be further reduced. The apparatus of FIG. 2 resembles that of FIG. 1 except that the rotating tube is substantially closed except for a connection to the vacuum means (via a scrubber) and, at the other end of the rotating tube, for a smaller tube through which reactants can be introduced into the rotating tube. In currently preferred embodiments a quantity of de-ionized water is introduced into the reaction volume of the tube, and a gaseous silica-containing halide (typically $SiCl_4$) (and possibly other gaseous reactants such as $GeCl_4$, $SnCl_4$, $TiCl_4$, $ZnCl_4$, $PbCl_2$, or $SbCl_3$, as well as a carrier gas such as He, Ar, $N_2$, or $O_2$) is delivered to the reaction volume through a standard delivery system, resulting in formation of a sol 16. Adequate mixing of the reactants and the water can generally be obtained through rotation of the tube, with rollers in place. The gelation is dependent on the rate of SiCl$_4$ delivery, but gelation occurs typically within several minutes of initial injection of gaseous reactant. At this point injection is stopped and the rotating tube heated above the boiling point of all the liquid components present in the reactive volume of the tube. The resulting vapor is exhausted through a scrubber as described above. Optionally, the rotating tube is partially surrounded by a refractory muffle, whereby the heating efficiency can be improved.

As in the previously discussed embodiment, the heat and/or the mechanical action of the rollers result in comminution of the gel material, such that substantially dry, porous particles of substantially uniform size result. Also as described above, the thus produced particles work their way to the lower end of the slightly tilted (not shown) rotating tube. Under typical exemplary conditions the particles are essentially dry and of the desired size after about 30 minutes of drying and comminution. The particles are then removed from the tube in any appropriate way.

Silica-based porous particles produced according to the invention can be used directly in the manufacture of a glass body, e.g., be used to overclad a glass rod using a plasma torch. However, at least for some applications it is considered advantageous to heat treat the porous particles to consolidate them into substantially glassy particles. Techniques for achieving such densification are well known. See, for instance, the above referred to U.S. Pat. No. 4,767,429.

Figure 3:
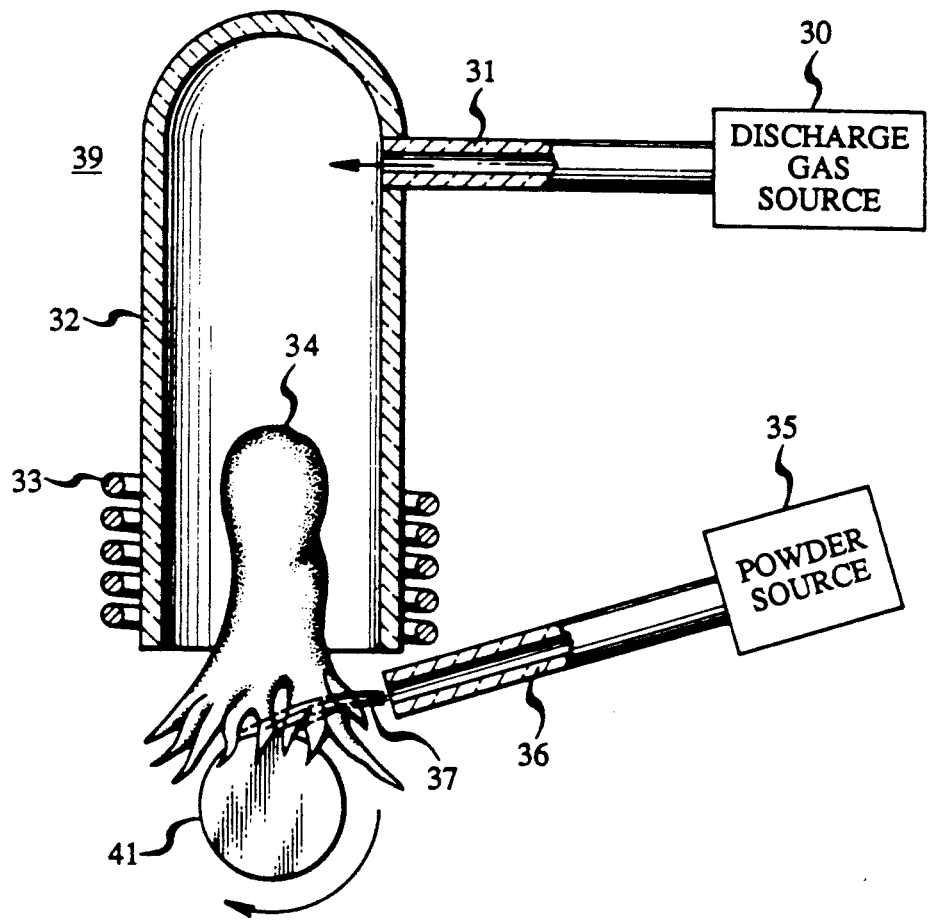

FIG. 3 schematically depicts exemplary apparatus for forming a glass body (e.g., an optical fiber preform from which an optical fiber can be drawn by a known technique) by fusion of particles in a plasma torch 39. In this exemplary apparatus, the plasma torch comprises a fused silica mantle 32 connected by a tube 31 to a gas source 30 which feeds the gas desired for the plasma discharge 34 into the mantle. The plasma is excited by means of RF coil 33 and an RF generator that is not shown. The particles are directed into the plasma region by a tube 36 from powder source 35, e.g., a vibratory powder feeder which continuously introduces a regulated quantity of powder into a stream of He. The powder-gas stream 37 issuing from 36 is directed at the circumference of the rotating glass boule 41 and fused thereto. The boule is formed by, e.g., initially providing a glass bait rod, and fusing particles to the circumference of the rod.

One of the significant advantages of the inventive technique is the possiblity of producing extremely pure particles. For instance, it has been possible to produce dried particulate material whose levels of alkalis were in the part per billion range. Although it is possible to maintain this high purity through optional densification in air it may at times be desirable to carry out the densification in a chlorine of fluorine-containing atmosphere. As is well known, heat treatment in a halogen-containing atmosphere can result in removal of impurities from the silica material.

A further significant advantage of the inventive method, especially if practices in conjunction with the Vapogel technique, is the wide compositional range that can be achieved. In addition to producing pure SiO$_2$ particles the method can produce particles that contain, in addition to SiO$_2$, oxides such as TiO$_2$, Al$_2$, GeO$_2$, P$_2$O or B$_2$O$_3$, or that contain F. Such particles can have utility in a variety of applications including optical fiber production. The dopant species can be present in the gas stream or can be dissolved in the aqueous medium. For instance, the gas stream used to produce the sol may comprise, in addition to the silica-containing halide, such other metal halides as GeCl$_4$, SnCl$_4$, TiCl$_4$, ZnCl$_4$, PbCl$_2$, or SbCl$_3$, or possibly, one or more metal fluorides, iodides, or bromides. The aqueous medium may contain water soluble salts (e.g., aluminum nitrate or chloride, tin chloride, ammonium phosphate, sodium carbonate, ammonium pentaborate, or ammonium bifluoride) or acids (e.g., H$_3$PO$_3$, H$_3$BO$_3$). The sol also can comprise pre-existing colloidal particles, e.g., fumed silica.

I claim:

1. Method of producing an article comprising a silica-containing glass body, the method comprising
    (a) providing a vessel with one or more moveable bodies therein;
    (b) introducing a silica-containing sol into, or forming a silica-containing sol in, the vessel, heating the vessel and causing a gel to form in the vessel from the sol, and causing the moveable bodies in the vessel to move relative to the vessel, such that substantially dry, porous, silica-containing particles are produced from the gel;
    (c) withdrawing the particles from the vessel; and
    (d) using at least some of the particles to produce at least part of the glass body.

2. Method of claim 1, wherein the sol is formed by a process that comprises providing a liquid aqueous medium and introducing a stream of silicon halide-containing gas into the aqueous medium.

3. Method of claim 1, wherein the sol is introduced into the vessel when the room temperature viscosity of the sol is in the range from about 10 to about 10,000 poise.

4. Method of claim 2, wherein the stream of gas comprises SiCl$_4$ gas and optionally at least one further halide gas.

5. Method of claim 2, wherein at least one member of the group consisting of aluminum nitrate, aluminum chloride, tin chloride, ammonium phosphate, sodium carbonate, ammonium pentaborate, ammonium bifluoride, H$_3$PO$_3$ and H$_3$BO$_3$ is dissolved in the liquid aqueous medium.

6. Method of claim 1, wherein the sol comprises pre-existing colloidal particles.

7. Method of claim 1, wherein step (d) comprises consolidating the porous particles into glass particles.

8. Method of claim 1, wherein step (d) comprises fusing the porous particles, or glass particles formed from the porous particles, to a glass substrate.

9. Method of claim 1, wherein the porous particles are of substantially uniform size, with at least 90% by weight of the particles having a size within ±2 standard deviations from the average size.

10. Method of claim 1, wherein the vessel is a tubular vessel having an axis, and a first and a second end, the vessel is positioned such that the second end is lower than the first end, the vessel is rotated about the axis and the particles exit from the second end in a substantially continuous flow.

11. Method of claim 10, wherein the vessel is a silica tube, and the one or more moveable bodies are silica bodies.

12. Method of producing an optical fiber comprising producing an optical fiber preform and drawing the optical fiber from the preform, wherein the preform is produced by a process that comprises (a) providing a tubular vessel with one or more moveable bodies therein, the vessel having an axis and a first and a second end, the vessel being positioned such that the second end is lower than the first;

(b) introducing a silica-containing sol into, or forming a silica-containing sol in, the vessel, heating the vessel and causing a gel to form in the vessel from the sol, and rotating the vessel about the axis such that the moveable bodies move relative to the vessel, such that substantially dry, porous, silica-containing particles of substantially uniform size are produced from the gel, with the particles leaving the vessel from the second end; and (c) incorporating at least some of the particles into the preform.

* * * * *

UNITED STATES PATENT AND TRADEMARK OFFICE
CERTIFICATE OF CORRECTION

PATENT NO. : 5,279,633
DATED : Jan. 18, 1994
INVENTOR(S) : James W. Fleming

It is certified that error appears in the above-indentified patent and that said Letters Patent is hereby corrected as shown below:

On title page, item [73] add the following:

--Assignee: Bell Telephone Laboratories, Incorporated and American Telephone and Telegraph Company--; and --add Attorney, Agent, or Firm: Eugen E. Pacher--

Signed and Sealed this

Fifth Day of July, 1994

Attest:

BRUCE LEHMAN

Attesting Officer          Commissioner of Patents and Trademarks